United States Patent
Hamm et al.

(10) Patent No.: US 9,555,546 B2
(45) Date of Patent: Jan. 31, 2017

(54) OPERATING MACHINE WITH REDUNDANT AXES AND RESOLUTION OF THE REDUNDANCY IN REAL TIME

(71) Applicant: SIEMENS AKTIENGESELLSCHAFT, München (DE)

(72) Inventors: Carsten Hamm, Erlangen (DE); Sven Tauchmann, Chemnitz (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/481,479

(22) Filed: Sep. 9, 2014

(65) Prior Publication Data
US 2015/0073593 A1 Mar. 12, 2015

(30) Foreign Application Priority Data
Sep. 10, 2013 (EM) .................................. 13183744

(51) Int. Cl.
*B25J 9/00* (2006.01)
*B25J 9/16* (2006.01)

(52) U.S. Cl.
CPC ............ *B25J 9/1664* (2013.01); *B25J 9/1643* (2013.01); *G05B 2219/40333* (2013.01); *G05B 2219/40336* (2013.01); *G05B 2219/40367* (2013.01)

(58) Field of Classification Search
CPC combination set(s) only.
See application file for complete search history.

(56) References Cited

U.S. PATENT DOCUMENTS 4,453,221 A * 6/1984 Davis ................. G05B 19/4163
318/568.13
4,529,921 A * 7/1985 Moribe ............... G05B 19/425
318/567

(Continued)

FOREIGN PATENT DOCUMENTS

AT 401 746 B 11/1996
CN 101497140 A 8/2009

(Continued)

OTHER PUBLICATIONS

Günter Schreiber et al.: "Solving the Singularity Problem of non-redundant Manipulators of Constraint Optimization", Proceedings of the 1999 IEEE/RSJ Internat.Conf.on Intelligent Robots and Systems, pp. 1482-1488; 1999.

*Primary Examiner* — Jonathan L Sample
(74) *Attorney, Agent, or Firm* — Henry M. Feiereisen LLC

(57) ABSTRACT

A program for a numerical control device is disclosed that determines path points to be approached by an end effector. A control signal group is ascertained for each path point that contains its set point value for each position-controlled axis. Those values are output to the axes, moving the end effector. The degrees of freedom are fewer than the position-controlled axes. The control signal groups are ascertained so that the end effector approaches the path points at least approximately. The control signal groups are ascertained gradually during the activation of the axes. The set point values are ascertained by minimizing an objective function. The objective function that is minimized includes at least the set point values for a path point only to be approached in the future. The sequence between the currently approached point and the point approached in the future has at least one further path point.

23 Claims, 3 Drawing Sheets

(56) References Cited

U.S. PATENT DOCUMENTS

| | | | | |
|---|---|---|---|---|
| 4,937,759 A * | 6/1990 | Vold | ................ | B25J 9/1602 |
| | | | | 700/262 |
| 4,975,856 A * | 12/1990 | Vold | ................ | B25J 9/1602 |
| | | | | 318/568.19 |
| 4,999,553 A * | 3/1991 | Seraji | ................ | B25J 9/1643 |
| | | | | 318/628 |
| 5,155,423 A * | 10/1992 | Karlen | ................ | B25J 9/04 |
| | | | | 318/568.1 |
| 5,157,418 A * | 10/1992 | Tamura | ................ | B41J 2/14129 |
| | | | | 347/50 |
| 5,187,418 A | 2/1993 | Minami et al. | | |
| 5,294,673 A * | 3/1994 | Deguchi | ................ | C08F 8/30 |
| | | | | 525/286 |
| 5,294,873 A | 3/1994 | Seraji | | |
| 5,465,037 A * | 11/1995 | Huissoon | ................ | B25J 9/1684 |
| | | | | 219/124.34 |
| 5,737,500 A * | 4/1998 | Seraji | ................ | B25J 9/1643 |
| | | | | 318/568.11 |
| 5,781,705 A * | 7/1998 | Endo | ................ | B25J 9/1643 |
| | | | | 318/568.22 |
| 6,004,016 A * | 12/1999 | Spector | ................ | B25J 9/1666 |
| | | | | 700/247 |
| 6,470,301 B1 * | 10/2002 | Barral | ................ | 703/1 |
| 6,526,373 B1 * | 2/2003 | Barral | ................ | B25J 9/1666 |
| | | | | 700/245 |
| 6,845,295 B2 | 1/2005 | Cheng et al. | | |
| 7,386,408 B2 * | 6/2008 | Nishibashi | ................ | B25J 9/1623 |
| | | | | 33/502 |
| 7,571,027 B2 * | 8/2009 | Freeman | ................ | B25J 9/1607 |
| | | | | 318/568.11 |
| 7,938,602 B2 * | 5/2011 | Ota | ................ | B23Q 1/4857 |
| | | | | 409/201 |
| 8,478,438 B2 * | 7/2013 | Nishibashi | ................ | G05B 19/4103 |
| | | | | 318/567 |
| 2002/0165637 A1 * | 11/2002 | Dillon | ................ | G05B 19/4097 |
| | | | | 700/162 |
| 2003/0171847 A1 * | 9/2003 | Cheng | ................ | G05B 19/4103 |
| | | | | 700/245 |
| 2005/0125100 A1 * | 6/2005 | Stoddard | ................ | B25J 9/1607 |
| | | | | 700/245 |
| 2005/0246062 A1 * | 11/2005 | Keibel | ................ | B25J 9/1607 |
| | | | | 700/245 |
| 2006/0071622 A1 * | 4/2006 | Townsend | ................ | B25J 9/1612 |
| | | | | 318/400.31 |
| 2006/0242818 A1 * | 11/2006 | Penick | ................ | B23Q 1/012 |
| | | | | 29/560 |
| 2007/0010898 A1 * | 1/2007 | Hosek et al. | ................ | 700/2 |
| 2007/0260356 A1 * | 11/2007 | Kock et al. | ................ | 700/261 |
| 2008/0039973 A1 * | 2/2008 | Ueno | ................ | B25J 9/1623 |
| | | | | 700/245 |
| 2009/0051938 A1 * | 2/2009 | Miousset | ................ | G01B 11/245 |
| | | | | 356/625 |
| 2010/0198404 A1 * | 8/2010 | Sonner | ................ | B25J 9/1664 |
| | | | | 700/250 |
| 2011/0288667 A1 * | 11/2011 | Noda | ................ | B25J 9/1661 |
| | | | | 700/98 |
| 2012/0095599 A1 * | 4/2012 | Pak | ................ | B25J 9/1664 |
| | | | | 700/275 |
| 2013/0013110 A1 * | 1/2013 | Gordon Petersen | ... | B25J 9/1664 |
| | | | | 700/255 |

FOREIGN PATENT DOCUMENTS

| | | |
|---|---|---|
| CN | 102152307 A | 8/2011 |
| EP | 0 465 661 A1 | 1/1992 |
| EP | 1 529 605 A2 | 5/2005 |
| EP | 1 591 209 A2 | 11/2005 |
| JP | S62231307 A | 10/1987 |
| JP | H08234824 A | 9/1996 |
| JP | 2001255917 A | 9/2001 |
| JP | 2002222005 A | 8/2002 |
| JP | 2010110878 A | 5/2010 |

* cited by examiner

OPERATING MACHINE WITH REDUNDANT AXES AND RESOLUTION OF THE REDUNDANCY IN REAL TIME

CROSS-REFERENCES TO RELATED APPLICATIONS

This application claims the priority of European Patent Application, Serial No. 13183744.5, filed Sep. 10, 2013, pursuant to 35 U.S.C. 119(a)-(d), the disclosure of which is incorporated herein by reference in its entirety as if fully set forth herein.

BACKGROUND OF THE INVENTION

The present invention relates to a control method for an operating machine. The present invention further relates to a system program having a machine code which can be executed by a numerical control device for an operating machine to execute such a control method, and to a numerical control device which can be programmed with such a system program, and to an operating machine.

The following discussion of related art is provided to assist the reader in understanding the advantages of the invention, and is not to be construed as an admission that this related art is prior art to this invention.

AT 401 746 B discloses a control method, a system program, an associated numerical control device and an associated operating machine, whereby a path to be left by the manipulator of a robot is divided into a multiplicity of chronologically equidistant path points. The respective robot configuration (i.e. the relevant position set point values of all the position-controlled axes) is ascertained and entered in a table for each path point or corresponding to this for each time. The position-controlled axes are activated after completion of the table, in other words only after ascertaining the robot configuration for all the path points.

Redundant robots (or similar operating machines with redundancies) are known. "Redundant" means that the machine structure has more degrees of freedom than necessary for the actual movement task. In the simplest case, in the event of such a redundancy explicit programming of all the position-controlled axes takes place when the user creates the user program so that the redundancy is practically unused. However, from AT 401 746 B for example, it is likewise already known only to program the actual control task (i.e. the path points to be approached by the end effector) and to specify additional boundary conditions which should be observed when ascertaining the position set point values. In this case, the numerical control device ascertains the position set point values of the position-controlled axes automatically on the basis of a predetermined criterion.

The approach taken by the AT 401 746 B is disadvantageous because the respective associated control signal group must always be ascertained in advance for all of the path points to be approached. In particular, this is time-consuming for long sequences of path points.

It would be desirable and advantageous to address prior art shortcomings.

SUMMARY OF THE INVENTION

According to one aspect of the present invention, a control method that determines a sequence of path points to be approached by an end effector of an operating machine in a given number of degrees of freedom, includes the steps of ascertaining a control signal group for each of the path points in the sequence, so that the respective control signal group for each path point contains respective position set points for a number of position-controlled axes of the operating machine for that path point, wherein the given number of degrees of freedom is smaller than the number of position-controlled axes, ascertaining position set point values of the control signal groups by minimizing a respective objective function while currently approaching a path point of one of the control signal groups, at that time the respective objective function including at least the position set point values for a path point only to be approached in the future and one other path point between the path point currently being approached and the path point to be approached in the future in the sequence of path points, and activating ascertained position set point values by providing the ascertained position set point values to the axes so as to move the end effector, each control signal group being ascertained such that the end effector approaches respective path points at least approximately during the activation of the position-controlled axes, and control signal groups are ascertained gradually during the activation of the position-controlled axes.

In accordance with the present invention, it is possible to continue ascertaining the position set point values in an advantageous manner by minimizing an objective function. However, it is possible to start activating the position-controlled axes and, corresponding with this, to start the method of the end effector before the position set point values are ascertained for all the path points.

It is possible for the numerical control device to ascertain the position set point values for the path point to be approached next by minimizing the respective objective function. In this case, the ascertaining of the position set point values can take place analogously to a predictive control. The prediction horizon can be determined as required in this case but—naturally—accounts for at least one path point.

If the prediction horizon accounts for more than one path point, the respective objective function can also include the position set point values of those path points which are within the sequence of path points between the path point to be approached in the future and the path point to be approached next.

Alternatively, it is possible for the numerical control device to ascertain the respective position set point values for the path point to be approached in the future by minimizing the respective objective function. In this case, the course of the position set point values of the position-controlled axes is known at any time for the respective prediction horizon during the activation of the position-controlled axes.

It is possible for the numerical control device to ascertain the position set point values individually for the respective path point. In some cases, however, it is possible to ascertain the position set point values in groups. In this case, the control method can therefore be embodied such that the numerical control device ascertains the position set point values for several path points by minimizing the respective objective function, the path points, the position set point values of which are ascertained by minimizing the respective objective function, form a coherent group within the sequence of path points to be approached and the coherent group contains the path point to be approached in the future.

In certain circumstances, this approach may be in particular highly efficient in terms of computation.

According to another advantageous feature of the present invention, the path points can be at defined distances from each other. The distances may be related to time or to the path defined by the sequence of path points as required.

According to another advantageous feature of the present invention, the respective objective function can also include time derivatives of the position set point values included in the respective objective function. In particular, excessive speeds, accelerations and jolts can be avoided by this means.

The objective function can, for example, be determined such that it takes into account the rigidity of the end effector. In particular, in the case of loads on the end effector, this approach results in high path accuracy.

The objective function can furthermore be determined such that it takes singularities and software limits into consideration. In particular, ambiguities and collisions can be avoided as a result.

According to another advantageous feature of the present invention, the objective function can include deviations of an actual path produced by the position set point values from a desired path defined by the sequence of path points. By this means, important secondary criteria (for example rigidity) can be optimized with tolerable deviations from the desired path.

According to another aspect of the present invention, a system program for enabling an operating machine to determine a sequence of path points to be approached by an end effector of the operating machine in a given number of degrees of freedom, includes a control signal group ascertained for each of the path points in the sequence, so that the respective control signal group for each path point contains respective position set points for a number of position-controlled axes of the operating machine for that path point, wherein the given number of degrees of freedom is smaller than the number of position-controlled axes, position set point values of respective control signal groups, said position set point values being ascertained by minimizing a respective objective function while currently approaching a path point of one of the control signal groups, at that time the respective objective function including at least the position set point values for a path point only to be approached in the future and one other path point between the path point currently being approached and the path point to be approached in the future in the sequence of path points, and activated ascertained position set point values that are activated by being provided to the axes so as to move the end effector, each control signal group being ascertained such that the end effector approaches respective path points at least approximately during the activation of the position-controlled axes, and control signal groups are ascertained gradually during the activation of the position-controlled axes.

According to the invention, a system program of the type mentioned in the introduction is embodied by—in brief—realizing a control method according to the invention through its execution. In particular, on account of the execution of the machine code, the system program can also realize the advantageous embodiments of the control method according to the invention. Furthermore, it can be stored on a data medium in machine-readable form, in electronic form for example.

According to still another aspect of the present invention, a programmed numerical control device using a system program for determining a sequence of path points to be approached by an end effector of an operating machine in a given number of degrees of freedom, includes a control signal group ascertained for each of the path points in the sequence, so that the respective control signal group for each path point contains respective position set points for a number of position-controlled axes of the operating machine for that path point, wherein the given number of degrees of freedom is smaller than the number of position-controlled axes, position set point values of respective control signal groups, said position set point values being ascertained by minimizing a respective objective function while currently approaching a path point of one of the control signal groups, at that time the respective objective function including at least the position set point values for a path point only to be approached in the future and one other path point between the path point currently being approached and the path point to be approached in the future in the sequence of path points; and activated ascertained position set point values that are activated by being provided to the axes so as to move the end effector, each control signal group being ascertained such that the end effector approaches respective path points at least approximately during the activation of the position-controlled axes, and control signal groups are ascertained gradually during the activation of the position-controlled axes.

According to still another aspect of the present invention, an operating machine having an end effector moved by position-controlled axes using a system program for determining a sequence of path points to be approached by an end effector in a given number of degrees of freedom, includes a control signal group ascertained for each of the path points in the sequence, so that the respective control signal group for each path point contains respective position set points for a number of position-controlled axes of the operating machine for that path point, wherein the given number of degrees of freedom is smaller than the number of position-controlled axes, position set point values of respective control signal groups, said position set point values being ascertained by minimizing a respective objective function while currently approaching a path point of one of the control signal groups, at that time the respective objective function including at least the position set point values for a path point only to be approached in the future and one other path point between the path point currently being approached and the path point to be approached in the future in the sequence of path points; and activated ascertained position set point values that are activated by being provided to the axes so as to move the end effector, each control signal group being ascertained such that the end effector approaches respective path points at least approximately during the activation of the position-controlled axes, and control signal groups are ascertained gradually during the activation of the position-controlled axes.

BRIEF DESCRIPTION OF THE DRAWING

Other features and advantages of the present invention will be more readily apparent upon reading the following description of currently preferred exemplified embodiments of the invention with reference to the accompanying drawing, in which.

Figure 1:
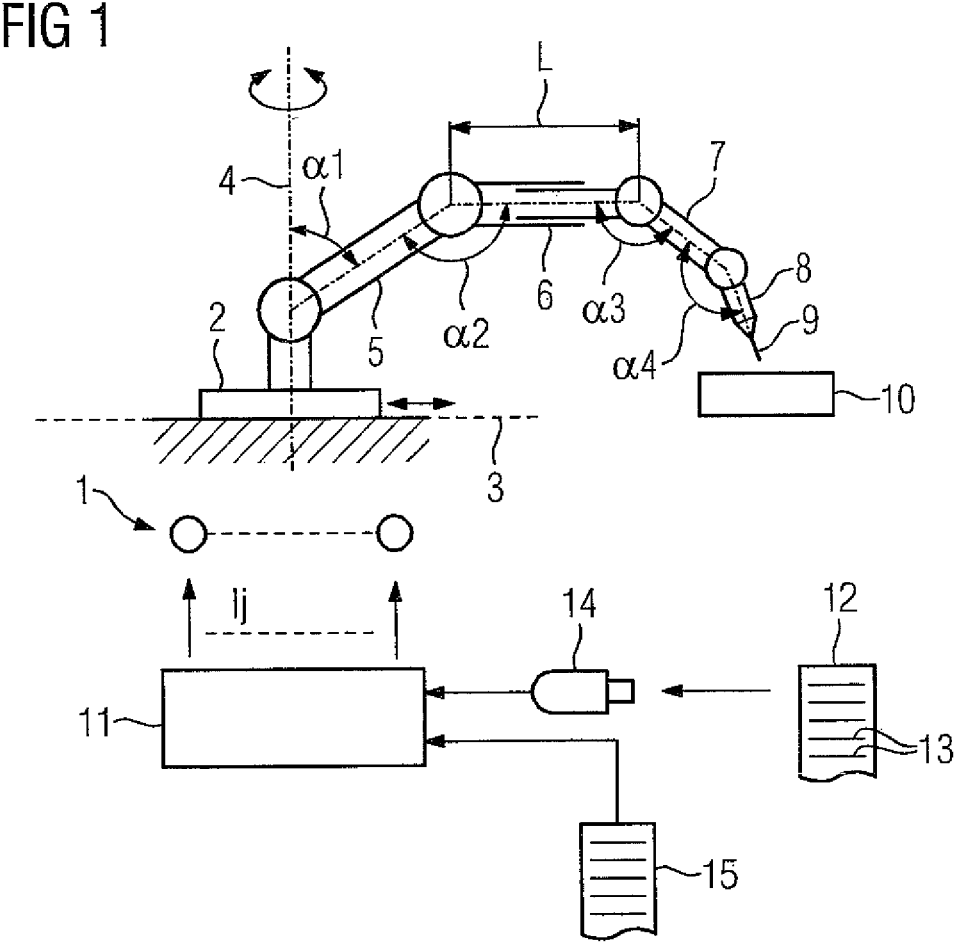
FIG. 1 is a schematic side view of an operating machine in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

DETAILED DESCRIPTION OF PREFERRED EMBODIMENTS

Figure 2:
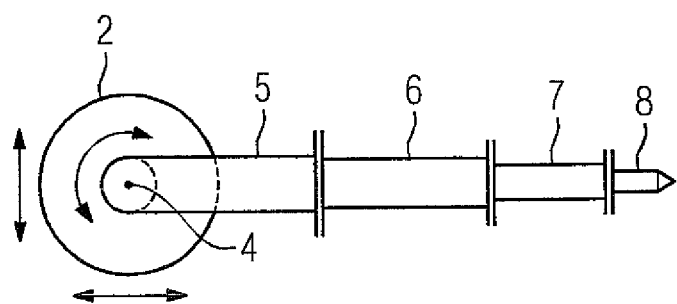
FIG. 2 is a top view of the operating machine of FIG. 1.

Turning now to the drawing, and in particular to FIG. 1, there is shown a schematic side view of an operating machine which usually has a number of position-controlled axes 1. In the diagrams of FIGS. 1 and 2 an operating machine with eight position-controlled axes 1 in total is shown purely as an example. In particular, with the operating machine of FIGS. 1 and 2, for example, the following axes 1 can be position-controlled:

Two axes 1, by means of which a base element 2 can be moved translationally in two directions linearly independent of each other—usually orthogonally to each other—on a horizontal plane 3.

One axis 1, by means of which the base element 2 can be rotated around a vertical axis 4, in other words, an axis 4 orthogonal to the horizontal plane 3.

One axis 1, by means of which an angle $\alpha 1$ of an upper arm link 5 can be adjusted in relation to the vertical axis 4.

One axis 1, by means of which an angle $\alpha 2$ of a central arm link 6 can be adjusted in relation to a longitudinal extension of the upper arm link 5.

One axis 1, by means of which a length L of the central arm link 6 can be adjusted.

One axis 1, by means of which an angle $\alpha 3$ of a lower arm link 7 can be adjusted in relation to a longitudinal extension of the central arm link 6.

One axis 1, by means of which an angle $\alpha 4$ of an end effector 8 can be adjusted in relation to a longitudinal extension of the lower arm link 7.

The end result is that the end effector 8 can thus be moved by means of corresponding position-controlled activation of the axes 1 and the position of the end effector 8 adjusted to a number of degrees of freedom.

In accordance with the example of FIGS. 1 and 2, the operating machine has eight position-controlled axes 1 in total. However, the precise number of position-controlled axes 1 is of secondary importance. What is crucial is that there are a certain number of position-controlled axes 1.

As a rule, the end effector 8 supports and holds a tool 9 by means of which a work piece 10 is to be machined. By means of the position-controlled axes 1, a position of the tool 9—or correspondingly a position of the end effector 8—is to be adjusted according to a sequence of path points P (see FIGS. 3 and 4). For each path point P, the end effector 8 is therefore to be positioned in a number of (translational and/or rotational) degrees of freedom in a position-controlled fashion. If, for example, the tool 9 is a rotating tool (for example, a drill or a milling head) or emits a stream or a beam (for example, a stream of water or a laser beam), it may be necessary to establish up to three translational and up to two rotational degrees of freedom fi for each path point P.

The path points are identified hereinafter, insofar as the points of a path are concerned in general, by the reference character P. Insofar as a distinction has to be drawn between individual path points P, the reference character P is supplemented by a figure as required.

Analogous to the number of position-controlled axes 1, the precise number of position-controlled degrees of freedom fi is of secondary importance. What is crucial is only that the path points P are defined in a certain number of degrees of freedom fi and that this number is smaller than the number of position-controlled axes 1 so that a certain redundancy exists.

According to FIG. 1, the operating machine has a numerical control device 11. The numerical control device 11 is designed as a software-programmable device. The function and mode of action of the numerical control device 11 is therefore established by means of a system program 12 with which the numerical control device 11 is programmed. The system program 12 comprises machine code 13 which can be executed by the numerical control device. The machine code 13 can be executed directly and immediately by the numerical control device 11. In this case, the machine code 13 consists directly of machine commands. Alternatively, the machine code 13 may consist of mnemonic notation which is converted into machine commands by the numerical control device 11 by means of interpretation. Alternatively or in addition, prior processing of the machine code 13 may be necessary, for example, decryption. Regardless of which approach is adopted, however, the numerical control device 11 can execute the machine code 13 without the need for a person to be intellectually involved.

The connection of the system program 12 to the numerical control device 11 can take place in any manner desired. For example, the system program 12 can be connected to the numerical control device 11 by means of a computer-to-computer connection over a data network. Alternatively, it is possible for the system program 12 to be stored on a data medium 14 (a USB memory stick is shown purely as an example in FIG. 1) in machine-readable form and connected to the numerical control device 11 via the data medium 14. As a rule, the system program 12 is permanently stored in the numerical control device 11. As a rule, it cannot be altered by a user (not shown in FIG. 1).

Execution of the machine code 13 by the numerical control device 11 results in the numerical control device 11 executing a control method which is explained in more detail hereinafter.

Figure 5:
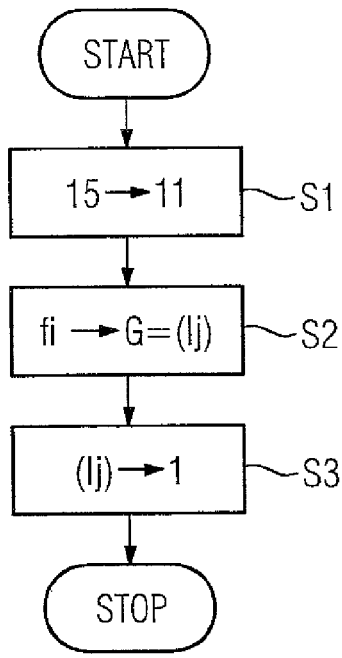
FIGS. 5 and 6 show respective flow charts.

First the numerical control device 11 accepts a user program 15 in accordance with FIG. 5 in a step S1 (see FIG. 1). The user program 15 can be connected to the numerical control device 11 in the same manner as the system program 12 or in another manner. As a rule, the user program 15 for the numerical control device 11 can be freely defined by the user.

The user program 15 establishes the sequence of path points P. In particular, for each path point P the respective position to be approached by the end effector 8 is determined in the corresponding degrees of freedom fi. On the other hand, a corresponding sequence of control signal groups G is not yet determined by the user program 15. Rather the control signal groups G are only ascertained in a step S2 by the numerical control device 11. In accordance with FIG. 5, for each position-controlled axis 1 each control signal group G contains its respective associated position set point value Ij valid for this path point P. Ascertainment takes place, naturally, in such a way that the end effector 8 approaches the path points P to be approached precisely or at least approximately. Thereupon the ascertained position set point values Ij—which in their entirety form the corresponding control signal group G—are output by the numerical control device 11 to the axes 1 in a step S3 and the end effector 8 moved as a result.

The present invention relates to the precise manner in which the ascertainment of the control signal groups G takes place.

An essential aspect of the present invention is that the numerical control device 11 ascertains the control signal groups G gradually during the activation of the position-controlled axes 1. Strictly speaking, the diagram in FIG. 5 is therefore not entirely correct because according to the diagram in FIG. 5 first the position set point values Ij are ascertained and only then are the position-controlled axes 1 activated. In actual fact, however, in accordance with FIG. 6 for the implementation of steps S2 and S3 of FIG. 5 a loop is executed repeatedly, wherein as part of the execution of this loop on the one hand in step S2 the associated control signal group G is ascertained for at least one path point P and on the other hand, in step S3 the associated control signal group G is output to the position-controlled axes 1 for a path point P.

A further essential aspect of the present invention is that the numerical control device 11, as shown in step S2, establishes a respective objective function F for the ascertainment of the respective control signal group G (=the position set point values Ij of this control signal group G) and—for example, by varying the position set point values Ij—ascertains a minimum of this objective function F. For at least one path point P, the position set point values Ij for which this minimum is achieved are the final position set point values Ij of the respective control signal group G.

The objective function F itself can be determined as required. For example, it is possible that in addition to the position set point values Ij of the path points P taken into consideration, the objective function F may also include time derivatives of the position set point values Ij included in the respective objective function F, in other words, in particular speeds, accelerations and/or jolts. Other conditions may also be taken into consideration as required. For example, the objective function F can be determined in such a way that it takes into account the rigidity of the end effector 8, in other words, its resilience when acted upon by external forces not applied by the axes 1. It is furthermore possible to take account of singularities and software limits in the objective function F. By taking account of singularities, for example, the uniqueness of the position set point values Ij found can be guaranteed. By taking account of software limits, collisions can be detected and avoided—at least within certain limits.

In the simplest case, as in AT 401 746 B mentioned in the introduction, a combination of position set point values Ij is ascertained for which the end effector 8 is moved to precisely the location (position and/or orientation) predetermined by the corresponding path point P. Alternatively, it is possible for deviations of an actual path produced as a result of the position set point values Ij from a desired path defined by the sequence of path points P to be included in the objective function F. Deviations are therefore "penalized" by higher values of the objective function F but are not categorically excluded. In this case, for example, a slight deviation of the actual path from the desired path may be permitted if as a result sufficiently large compensation is obtained through improvement of another criterion (for example, rigidity) to be achieved. If necessary, the extent of a possible deviation of the actual path from the desired path can be limited by a condition of inequality to be observed, in other words, by means of the specification that the maximum permissible deviation may not exceed a predetermined limit value.

It is possible that the position set point values Ij ascertained within the context of step S2 are those position set point values Ij which are output on the position-controlled axes 1 in step S3 executed immediately thereafter. Alternatively, it is possible that the position set point values Ij ascertained within the context of step S2 are only output at a later time to the position-controlled axes 1. Both will be explained in more detail hereinafter. Regardless of whether the position set point values Ij ascertained within the context of step S2 are output to the position-controlled axes 1 in step S3 executed immediately thereafter or only at a later time, at least the position set point values Ij for a path point P only to be approached in the future are included in the ascertainment of the position set point values Ij of the respective control signal group G—in other words, the ascertainment of the position set point values Ij of the control signal group G which takes place for the current execution of the loop shown in FIG. 6.

Figure 6:
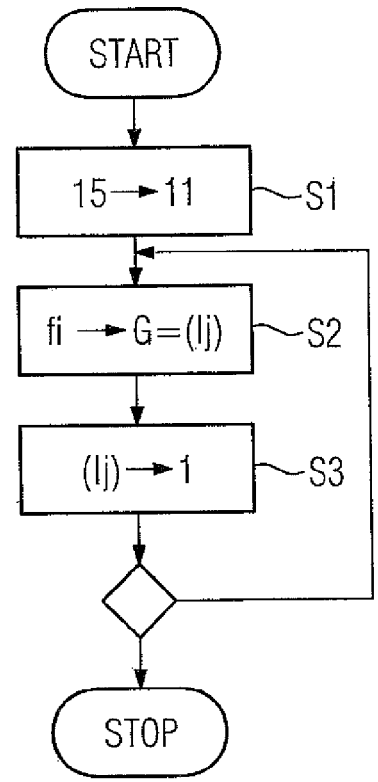

With regard to the individual execution of the loop of FIG. 6, the path point P to be approached in the future, the position set point values Ij of which are taken into account in step S2, and the path point P approached in step S3 are therefore different path points P from each other. Between the currently approached path point P—i.e. the path point P which is approached before the execution of the loop shown in FIG. 6—and the path point P to be approached in the future—i.e. the path point P for which in step S2 its position set point values Ij are taken into account—there is therefore at least one further path point P of the sequence, namely that path point P which is approached in step S3. The corresponding path points are shown—purely by way of example—in FIGS. 3 and 4 and given the reference characters P1, P2 and P3. P1 refers to the path point currently approached, i.e. the path point which is approached before the respective execution of the loop shown in FIG. 6. P3 refers to the path point to be approached in the future—i.e. that path point the position set point values Ij of which are taken into account in step S2. P2 refers to the intermediary path point which is approached in step S3.

Figure 7:
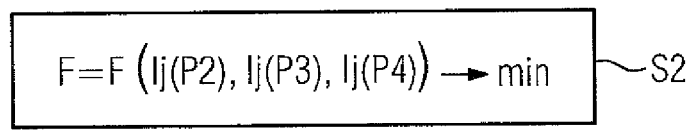
FIGS. 7 and 8 illustrate respective objective functions.

As aforementioned, it is possible that the position set point values Ij ascertained within the context of step S2 are those position set point values Ij which are output in step S3 executed immediately thereafter to the position-controlled axes 1. In this case, by minimizing the respective objective function F, the numerical control device 11 therefore ascertains the respective position set point values Ij for the path point P2 to be approached next. In this case, as shown in FIG. 7, the numerical control device 11 can establish an objective function F, for example, in which on the one hand the position set point values Ij for the path point P2, naturally, and in addition the position set point values Ij for the path point P3, are included. If there are further path points between the path point P2 and the path point P3 within the sequence of path points P—indicated by P4 in FIGS. 3 and 4—as shown in FIG. 7, in addition the objective function F preferably also includes their position set point values Ij. By means of this approach, for example, analogous to a predictive control, circumstances which will only occur in the future can be taken into account in the ascertainment of the position set point values Ij to be output next. In certain circumstances it may be useful to also include path points from the past—indicated by P5 in FIGS. 3 and 4—in addition to the path points P2, P3, P4.

Figure 8:
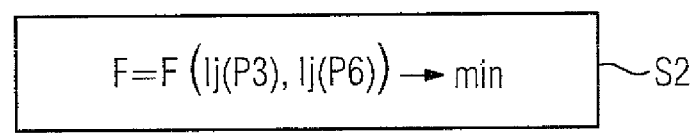

As also aforementioned, alternatively it is possible that the position set point values Ij ascertained in step S2 are only output at a later time to the position-controlled axes 1. In this case the numerical control device 11 may, for example, have a kind of shift register or another data buffer or circulating storage so that the position set point values Ij for the path point P3 to be approached in the future can always be ascertained with a certain lead time. In this case, as shown in FIG. 8 it is possible that the respective objective function F only includes the position set point values Ij for the path point P3 to be approached in the future. Alternatively, it is also possible to take into account the position set point values Ij of further path points P for this ascertainment. For example—see FIGS. 3 and 4—as shown in FIG. 8, the path points P6 can be taken into account which are still further in the future in relation to the path point P3.

Figure 3:
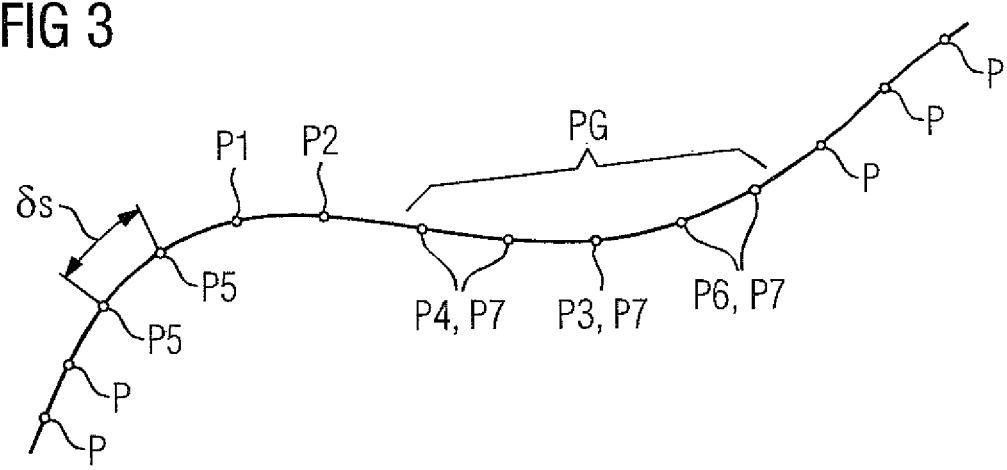
FIGS. 3 and 4 show respective desired paths.
Figure 4:
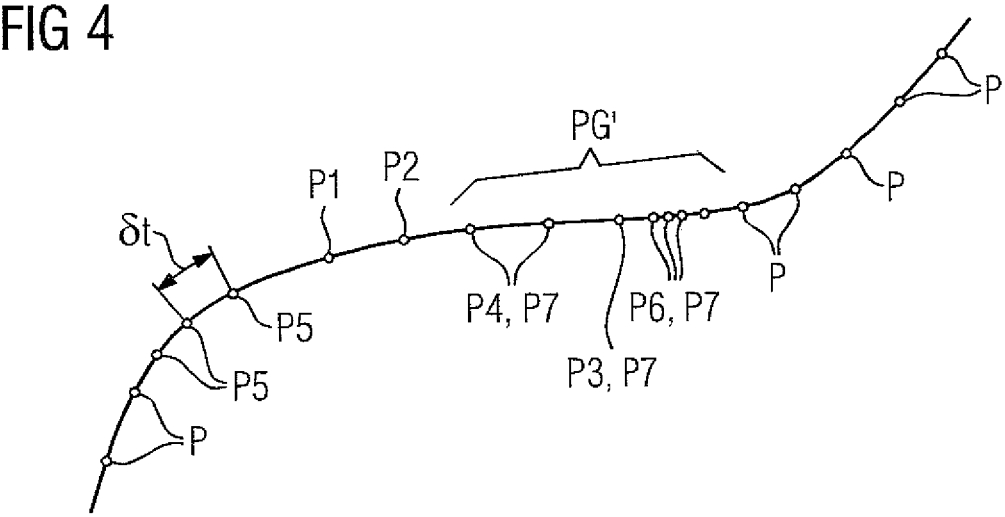

As a rule, the individual path points P are at a defined (usually constant) distance δs, δt from each other. It is possible that the distance δs as shown in FIG. 3 is related to the length of the section of path which is between the adjacent path points P. Alternatively, it is possible that the distance δt as shown in FIG. 4 is related to time.

As a rule, the numerical control device 11 will ascertain the position set point values Ij of the individual control signal groups G individually. As a rule, the numerical control device 11 will therefore establish and minimize an individual objective function F for each path point P. In individual cases, however, it may be possible that the numerical control device 11 ascertains the position set point values Ij for several path points P by minimizing the respective objective function F. In this case the path points P, the position set point values Ij of which are ascertained by minimizing the respective objective function F, form a coherent group within the sequence of path points P to be approached, for example, the group PG in FIG. 3 or the group PG' in FIG. 4. In this case, the coherent group PG or PG' of path points P contains the future path point P3 to be approached.

For example, it may be possible that the desired path is defined in a manner known per se by splines that can be parameterized and that an analytic solution of the objective function F can be ascertained for each of the individual splines. Alternatively, that path point—indicated by P7 in FIGS. 3 and 4—which is the most critical path point according to the optimization criterion of the objective function F can be ascertained by means of known optimization methods within the respective group PG or PG' of path points P. In this case, the minimization of the objective function F for the path point P7 can take place and—insofar as it relates to the resolution of the redundancies—be adopted for the other path points P of the corresponding group PG or PG'.

In short, the present invention therefore relates to the following circumstances:

A numerical control device 11 accepts a user program 15 which determines a sequence of path points P to be approached by an end effector 8 in a number of degrees of freedom fi. The numerical control device 11 ascertains a control signal group G for each of the path points P which contains its position set point value Ij for each of a number of position-controlled axes 1. The numerical control device 11 outputs the ascertained position set point values Ij to the axes 1 and moves the end effector 8 as a result. The number of degrees of freedom fi is smaller than the number of position-controlled axes 1. The numerical control device 11 ascertains the control signal groups G in such a way that the end effector 8 approaches the path points P to be approached at least approximately. The numerical control device 11 ascertains the control signal groups G gradually during the activation of the position-controlled axes 1. It ascertains the position set point values Ij of the control signal groups G by minimizing a respective objective function F. The objective function F, which is minimized during the approach of one of the path points P1, includes at least the position set point values Ij for a path point P3 at this time only to be approached in the future. There is at least one further path point P2 of the sequence between the currently approached path point P1 and the path point P3 to be approached in the future.

The present invention has many advantages. In particular, it is possible to ensure a method of the end effector 8 in real time which is constant in terms of path and orientation in a relatively simple and reliable manner, without having to explicitly program all the position-controlled axes 1 of the redundant operating machine. Nevertheless, the work piece 10 can easily be machined quickly and precisely.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A control method that determines a sequence of path points to be approached by an end effector of an operating machine in a given number of degrees of freedom, comprising the steps of:
    ascertaining a control signal group for each of the path points in the sequence, so that the respective control signal group for each path point contains respective position set points for a number of position-controlled axes of the operating machine for that path point, wherein the given number of degrees of freedom is smaller than the number of position-controlled axes;
    ascertaining position set point values of the control signal groups by minimizing a respective objective function while currently approaching a path point of one of the control signal groups, at that time the respective objective function including at least the position set point values for a path point only to be approached in the future and one other path point between the path point currently being approached and the path point to be approached in the future in the sequence of path points; and
    activating ascertained position set point values by providing the ascertained position set point values to the axes, each control signal group being ascertained such that the end effector approaches respective path points at least approximately during the activation of the position-controlled axes, and control signal groups are ascertained gradually during the activation of the position-controlled axes; and
    moving the end effector with the axes using the ascertained position set point values.

2. The control method of claim 1, further comprising the step of ascertaining position set point values for the path point to be approached next by minimizing the respective objective function.

3. The control method of claim 2 wherein a respective objective function also includes the position set point values of path points that are in the sequence of path points between the path point to be approached in the future and the path point to be approached next.

4. The control method of claim 1, wherein each of the position set point values is ascertained for the path point to be approached in the future by minimizing the respective objective function.

5. The control method of claim 1, wherein position set point values for several path points are ascertained by minimizing the respective objective function and form a coherent group within the sequence of path points to be approached that contains the path point to be approached in the future.

6. The control method of claim 1, wherein path points are spaced at distances from each other, defined by time or by the path defined by the sequence of path points.

7. The control method of claim 1, wherein a respective objective function also includes time derivatives of the position set point values included in the respective objective function.

8. The control method of claim 1, wherein the objective function is determined such that it takes into account the rigidity of the end effector.

9. The control method of claim 1, wherein singularities and software limits are taken into account in the objective function.

10. The control method of claim 1, wherein the objective function includes deviations of an actual path produced by the position set point values from a desired path defined by the sequence of path points.

11. A system program for enabling an operating machine to determine a sequence of path points to be approached by an end effector of the operating machine in a given number of degrees of freedom, said program comprising:
- a control signal group ascertained for each of the path points in the sequence, so that the respective control signal group for each path point contains respective position set points for a number of position-controlled axes of the operating machine for that path point, wherein the given number of degrees of freedom is smaller than the number of position-controlled axes;
- position set point values of respective control signal groups, said position set point values being ascertained by minimizing a respective objective function while currently approaching a path point of one of the control signal groups, at that time the respective objective function including at least the position set point values for a path point only to be approached in the future and one other path point between the path point currently being approached and the path point to be approached in the future in the sequence of path points; and
- activated ascertained position set point values that are activated by being provided to the axes that move the end effector, each control signal group being ascertained such that the end effector approaches respective path points at least approximately during the activation of the position-controlled axes, and control signal groups are ascertained gradually during the activation of the position-controlled axes.

12. The system program of claim 11, further comprising a data medium on which the system program is stored in machine-readable form.

13. The system program of claim 11, further comprising ascertained position set point values for the path point to be approached next that are ascertained by minimizing the respective objective function.

14. The system program of claim 13, wherein a respective objective function also includes the position set point values of path points that are in the sequence of path points between the path point to be approached in the future and the path point to be approached next.

15. The system program of claim 11, wherein each of the position set point values is ascertained for the path point to be approached in the future by minimizing the respective objective function.

16. The system program of claim 11, wherein position set point values for several path points are ascertained by minimizing the respective objective function and form a coherent group within the sequence of path points to be approached that contains the path point to be approached in the future.

17. The system program of claim 11, wherein path points are spaced at distances from each other, defined by time or by the path defined by the sequence of path points.

18. The system program of claim 11, wherein a respective objective function also includes time derivatives of the position set point values included in the respective objective function.

19. The system program of claim 11, wherein the objective function is determined such that it takes into account the rigidity of the end effector.

20. The system program of claim 11, wherein singularities and software limits are taken into account in the objective function.

21. The system program of claim 11, wherein the objective function includes deviations of an actual path produced by the position set point values from a desired path defined by the sequence of path points.

22. A programmed numerical control device using a system program for determining a sequence of path points to be approached by an end effector of an operating machine in a given number of degrees of freedom, comprising:
- a control signal group ascertained for each of the path points in the sequence, so that the respective control signal group for each path point contains respective position set points for a number of position-controlled axes of the operating machine for that path point, wherein the given number of degrees of freedom is smaller than the number of position-controlled axes;
- position set point values of respective control signal groups, said position set point values being ascertained by minimizing a respective objective function while currently approaching a path point of one of the control signal groups, at that time the respective objective function including at least the position set point values for a path point only to be approached in the future and one other path point between the path point currently being approached and the path point to be approached in the future in the sequence of path points; and
- activated ascertained position set point values that are activated by being provided to the axes that move the end effector, each control signal group being ascertained such that the end effector approaches respective path points at least approximately during the activation of the position-controlled axes, and control signal groups are ascertained gradually during the activation of the position-controlled axes.

23. An operating machine having an end effector moved by position-controlled axes using a system program for determining a sequence of path points to be approached by an end effector in a given number of degrees of freedom, comprising:

a control signal group ascertained for each of the path points in the sequence, so that the respective control signal group for each path point contains respective position set points for a number of position-controlled axes of the operating machine for that path point, wherein the given number of degrees of freedom is smaller than the number of position-controlled axes;

position set point values of respective control signal groups, said position set point values being ascertained by minimizing a respective objective function while currently approaching a path point of one of the control signal groups, at that time the respective objective function including at least the position set point values for a path point only to be approached in the future and one other path point between the path point currently being approached and the path point to be approached in the future in the sequence of path points; and activated ascertained position set point values that are activated by being provided to the axes that move the end effector, each control signal group being ascertained such that the end effector approaches respective path points at least approximately during the activation of the position-controlled axes, and control signal groups are ascertained gradually during the activation of the position-controlled axes.

* * * * *

UNITED STATES PATENT AND TRADEMARK OFFICE
CERTIFICATE OF CORRECTION

| | | |
|---|---|---|
| PATENT NO. | : 9,555,546 B2 | Page 1 of 1 |
| APPLICATION NO. | : 14/481479 | |
| DATED | : January 31, 2017 | |
| INVENTOR(S) | : Carsten Hamm et al. | |

It is certified that error appears in the above-identified patent and that said Letters Patent is hereby corrected as shown below:

On the Title Page

Column 1, under FOREIGN APPLICATION PRIORITY DATA correct "EM 13183744" to read --EP 13183744--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*